(12) United States Patent
Magee et al.

(10) Patent No.: US 7,457,232 B2
(45) Date of Patent: Nov. 25, 2008

(54) FREQUENCY SWITCHED PREAMBLE DESIGN TO MINIMIZE CHANNEL ESTIMATION TIME IN MIMO COMMUNICATIONS SYSTEMS

(75) Inventors: David P Magee, Allen, TX (US); Manish Goel, Plano, TX (US); Michael T. Direnzo, Coppell, TX (US); Michael O. Polley, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 892 days.

(21) Appl. No.: 10/929,705

(22) Filed: Aug. 30, 2004

(65) Prior Publication Data

US 2005/0170831 A1    Aug. 4, 2005

Related U.S. Application Data

(60) Provisional application No. 60/542,182, filed on Feb. 4, 2004.

(51) Int. Cl.
*H04J 11/00* (2006.01)
(52) U.S. Cl. ..................... 370/208; 370/389
(58) Field of Classification Search ............... 370/208, 370/338, 341, 259, 431, 506, 908, 235, 229, 370/230, 236, 237, 389, 395.54, 471, 474, 370/535; 455/458, 512; 375/346, 231, 232, 375/341
See application file for complete search history.

(56) References Cited

U.S. PATENT DOCUMENTS 6,618,452 B1 * 9/2003 Huber et al. ............... 375/343
7,269,430 B2 * 9/2007 Moorti et al. ............. 455/458

* cited by examiner

*Primary Examiner*—Chi H Pham
*Assistant Examiner*—Alexander Boakye
(74) *Attorney, Agent, or Firm*—Steven A. Shaw; W. James Brady; Frederick J. Telecky, Jr.

(57) ABSTRACT

A preamble frequency switching design technique for frequency switching the training symbols within the preamble associated with a MIMO communication system ensures that data throughput is optimized.

23 Claims, 2 Drawing Sheets

FREQUENCY SWITCHED PREAMBLE DESIGN TO MINIMIZE CHANNEL ESTIMATION TIME IN MIMO COMMUNICATIONS SYSTEMS

RELATED PATENT APPLICATIONS

This application claims the benefit, under 35 U.S.C. §119 (e) (1), of U.S. Provisional Application Ser. No. 60/542,182, entitled Frequency Switched Preamble Design to Minimize Channel Estimation Time in MIMO Communication Systems, filed Feb. 4, 2004 by David P. Magee, Manish Goel and Michael T. DiRenzo, and is incorporated by reference in its entirety herein.

BACKGROUND OF THE INVENTION

1. Field of the Invention

This invention relates generally to wireless communication systems, and more particularly to a method of frequency switching the preamble to minimize the channel estimation time in multiple input multiple output (MIMO) communication systems.

2. Description of the Prior Art

Increasing the capacity and reliability of communication systems is a focus driving much of systems technology growth. MIMO communication systems support this growth in the development of wireless networks. MIMO communication systems have been shown to provide improvements in both capacity and reliability over single-input single-output (SISO) communication systems. These MIMO communication systems commonly employ a block structure wherein a MIMO transmitter (which is a cooperating collection of N single-dimension transmitters) sends a vector of symbol information. This symbol vector may represent one or more coded or uncoded SISO data symbols. A MIMO receiver (which is a cooperating collection of M single-dimension receivers, where M is greater than or equal to N) receives one or more copies of this transmitted vector of symbol information. The performance of the entire communication system hinges on the ability of the receiver to find reliable estimates of the symbol vector that was sent by the transmitter. This necessitates that the MIMO receiver provide reliable channel estimates associated with transmissions from the MIMO transmitter.

A 2×2 MIMO communication system, for example, may transmit two independent and concurrent signals, employing two single-dimension transmitters having separate transmit antennas and two single-dimension receivers having separate receive antennas. Alternatively, the antennas could be derived from a single physical antenna that appropriately employs polarization. Two receive signals $Y1(k)$, $Y2(k)$ on the $k^{th}$ sub-carrier/tone following a Fast Fourier Transformation and assuming negligible inter-symbol interference may be written as:

$$Y1(k)=H11(k)*X1(k)+H12(k)*X2(k)+n1(k)$$

$$Y2(k)=H21(k)*X1(k)+H22(k)*X2(k)+n2(k)$$

where $X1(k)$ and $X2(k)$ are two independent signals transmitted on the $k^{th}$ sub-carrier/tone from the first and second transmit antennas, respectively, and $n1$ and $n2$ are noises associated with the two receive signals. The term $Hij(k)$, where $i=1, 2$ and $j=1, 2$, incorporates gain and phase distortion associated with symbols transmitted on the $k^{th}$ sub-carrier/tone from transmit antenna j to receive antenna i. The channel gain and phase terms $Hij(k)$ may also include gain and phase distortions due to signal conditioning stages such as filters and other analog electronics. The receiver is required to provide estimates of the channel values $Hij(k)$ to reliably decode the transmitted signals $X1(k)$ and $X2(k)$.

In order to estimate the channel coefficients $Hij(k)$ at the receiver, the transmitter and the receiver employ training sequences. These training sequences are predetermined and known at both the transmitter and the receiver. In an IEEE 802.11(a) compliant system, a training sequence (called a long sequence) is employed as part of a preamble to the transmission of data. This long sequence involves the transmission of a known sequence of vector symbols, employing 52 excited tones (1 or −1), an unexcited tone (0) at DC and unexcited tones at each end of the spectrum, to provide a guard interval that is used to protect data tones from pass band filter effects. An appropriate calculation of individual channel coefficients (i.e., $H11(k)$, $H12(k)$, $H21(k)$, $H22(k)$) may typically require a processor employing complex computations. Additionally, the level of computational complexity usually increases with an increase in the number of transmit antennas.

Time switched preamble designs commonly associated with MIMO communication systems, often result in long preamble times (i.e. preambles with many training symbols) which compromise data throughput.

Accordingly, what is needed in the art is a technique for switching the training symbols within the preamble associated with a MIMO communication system to ensure that data throughput is optimized.

SUMMARY OF THE INVENTION

The present invention is directed to a technique for frequency switching the training symbols within the preamble associated with a MIMO communication system in a manner that ensures the data throughput is optimized.

In one aspect, a method of frequency switching a preamble is more time efficient than that achievable using a time switched preamble design.

In another aspect, a method of frequency switching a preamble optimizes the MIMO channel estimation process in the receiver with respect to time.

In yet another aspect, a method of frequency switching a preamble improves data throughput associated with a MIMO communication system by minimizing the number of symbols used for channel estimation.

In still another aspect, a method of frequency switching a preamble provides for backward compatibility with existing 802.11a wireless communication systems.

According to one embodiment, a method of minimizing communication channel estimation time comprises the steps of:

transmitting a first frequency switched training sequence portion of a preamble comprising tones associated solely with the first frequency switched training sequence; and transmitting a second frequency training sequence portion of the preamble subsequent to transmission of the first frequency switched training sequence portion of the preamble, wherein the second frequency training sequence comprises tones associated solely with the second frequency switched training sequence.

According to another embodiment, a method of minimizing communication channel estimation time comprises the steps of:

acquiring a preamble;

transmitting a first frequency switched training sequence portion of the preamble; and transmitting a second frequency training sequence portion of the preamble subsequent to transmission of the first frequency switched training sequence portion of the preamble, such that interleaved tones are generated there from.

According to yet another embodiment, a method of minimizing communication channel estimation time comprises the steps of:

partitioning a preamble into parts comprising a first frequency switched training sequence and a second frequency switched training sequence;

transmitting the first and second frequency switched training sequences such that interleaved tones are generated there from; and interpolating the interleaved tones transmitted during the first and second frequency training sequences and generating communication channel estimates at missing tones there from.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
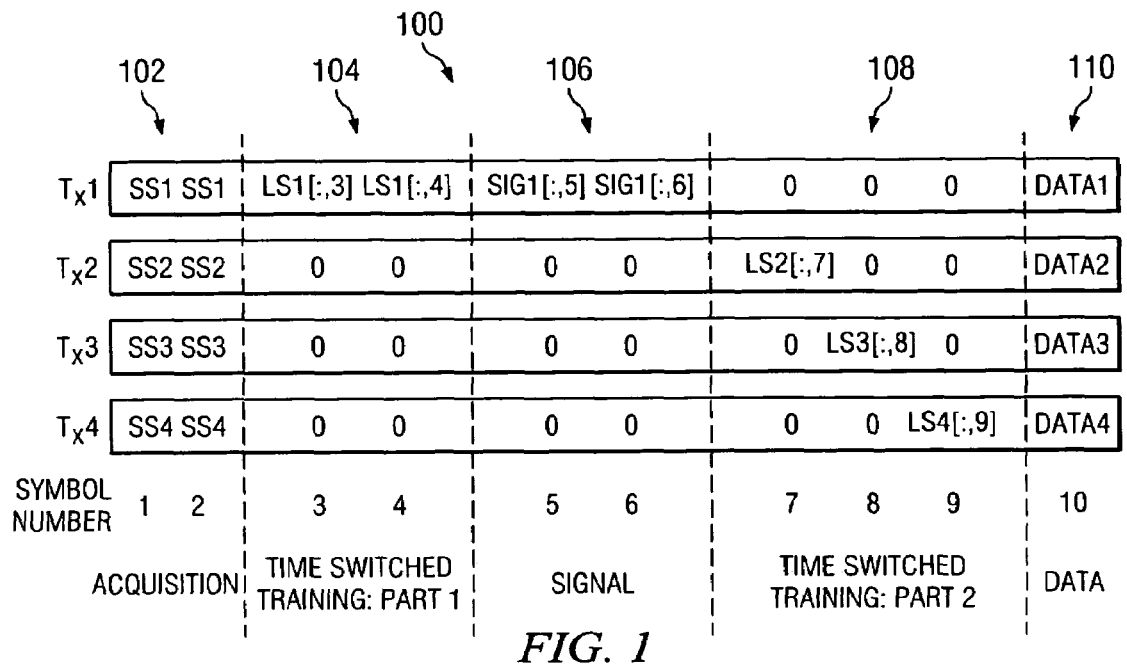
FIG. 1 illustrates a time switched preamble structure associated with four transmitters.
Figure 2:
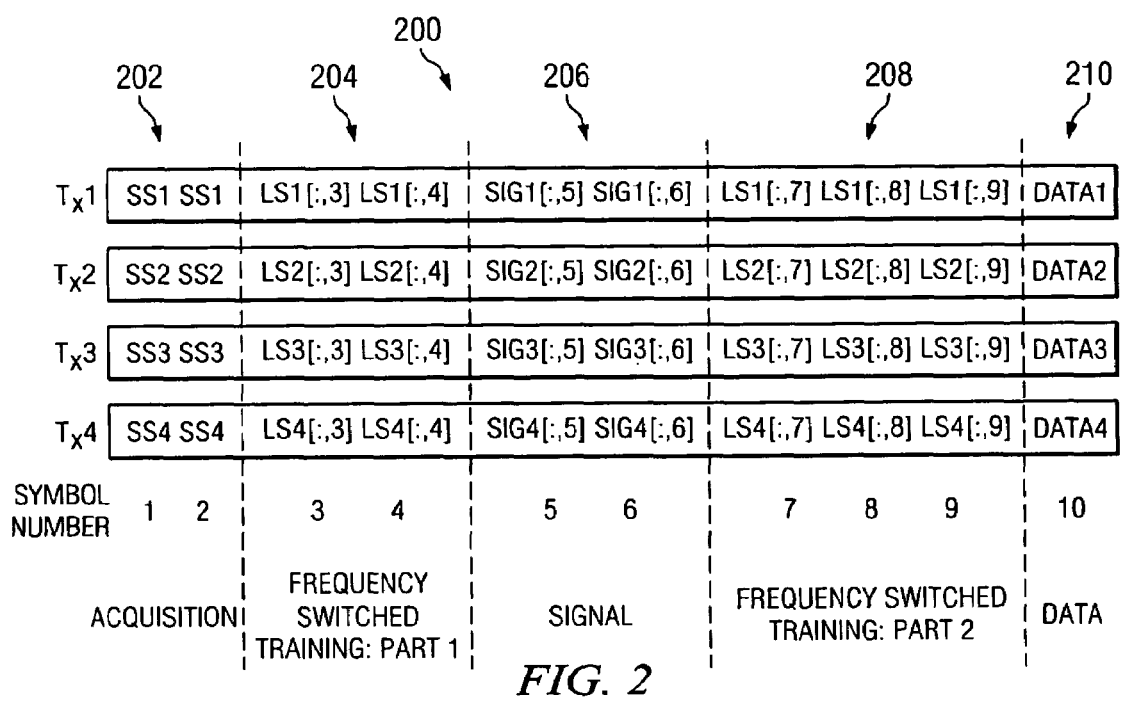
FIG. 2 illustrates a frequency switched preamble structure associated with four transmitters.

FIG. 1 illustrates a time switched preamble structure 100 associated with four transmitters; while FIG. 2 illustrates a frequency switched preamble structure 200 associated with four transmitters. It can be seen that each preamble structure 100, 200 has been partitioned into five major sections. Preamble structure 100 has been partitioned into an acquisition section 102, a first part of a time switched training section 104, a signal section 106, a second part of a time switched training section 108, and a data section 110. Preamble structure 200 has similarly been partitioned into an acquisition section 202, a first part of a frequency switched training section 204, a signal section 206, a second part of a frequency switched training section 208, and a data section 210. In order to preserve brevity and to preserve clarity, the detailed descriptions of the preferred embodiments herein after, will focus only on part 1 and part 2 of the training sequences 104, 108 and 204, 208 respectively, to minimize the preamble time (and thus minimize the channel estimation time at the associated receiver).

In order to preserve backward compatibility with 802.11a, the frequency switched training 204 in part 1 shown in FIG. 2 must contain a single symbol for each transmit path that is repeated to form a two symbol training sequence, and must equal a scaled multiple of the IEEE 802.11a compliant long sequence when summed on a tone by tone basis. It can be seen that both preamble structures 100, 200 use the same number of symbols to energize all of the tones in each channel path of the communication link. The frequency switched structure 200 however, can be time optimized if interleaving is permitted in the preamble design. Interleaving is defined when only some tones are energized in some training sequences and other tones are energized in other training sequences. Using an interpolation method, the channel estimates at the missing tones can be determined by the receiver.

The delay spread of the wireless channel will of course determine the amount of interleaving permitted in the preamble design. If, for example, one assumes that the IEEE 802.11a compliant cyclic prefix bounds the delay spread of the wireless channel (0.8 usec), then an interleaving factor of 4 is admissible in the frequency switched preamble structure 200 for WLAN systems (20 MHz channels). Since many indoor wireless channel models have a RMS delay spread of 30-40 nsec, however, the cyclic prefix would only need to be 0.4 usec, using the rule of thumb that the cyclic prefix is roughly 10 times the delay spread. The interleaving factor could therefore be extended to 8.

With continued reference now to FIG. 2, $LS_n[k,b]$ denotes the frequency domain representation of the training symbol LS at tone index k, symbol number b and transmit antenna n. Given a general training sequence $TS[k]$ of length Z, which might be the long sequence from 802.11a, for example, the following equations describe one possible frequency switched set of training symbols.

$$LS_1[k, 3] = LS_1[k, 4]$$
$$= LS_2[k, 9]$$
$$= LS_3[k, 8]$$
$$= LS_4[k, 7]$$
$$= \begin{cases} TS[k] & \text{for } k = 4z \\ 0 & \text{otherwise} \end{cases}$$

$$LS_2[k, 3] = LS_2[k, 4]$$
$$= LS_3[k, 9]$$
$$= LS_4[k, 8]$$
$$= LS_1[k, 7]$$
$$= \begin{cases} TS[k] & \text{for } k = 4z + 2 \\ 0 & \text{otherwise} \end{cases}$$

$$LS_3[k, 3] = LS_3[k, 4]$$
$$= LS_4[k, 9]$$
$$= LS_1[k, 8]$$
$$= LS_2[k, 7]$$
$$= \begin{cases} TS[k] & \text{for } k = 4z + 1 \\ 0 & \text{otherwise} \end{cases}$$

$$LS_4[k, 3] = LS_4[k, 4]$$
$$= LS_1[k, 9]$$
$$= LS_2[k, 8]$$
$$= LS_3[k, 7]$$
$$= \begin{cases} TS[k] & \text{for } k = 4z + 3 \\ 0 & \text{otherwise} \end{cases}$$

where $z \in \{0, 1, \ldots, \frac{Z}{4} - 1\}$, which is shown in FIG. 2.

$Y_m[k,b]$ denotes the frequency domain representation of the received signal Y at tone index k, symbol number b and receive antenna m. The resulting received signals, given the training signals above, can be written as $$Y_m[k,b] = H_{m1}[k]LS_1[k,b] + H_{m2}[k]LS_2[k,b] + H_{m3}[k]LS_3[k,b] + H_{m4}[k]LS_4[k,b] + n_m[k,b]$$

where $H_{mn}[k]$ denotes the channel estimate from transmit antenna n to receive antenna m for tone k and $n_m[k,b]$ is the noise in each received signal at tone index k, symbol number b and receive antenna m.

Given that all of the subchannels have been energized by each antenna over symbols 4, 7, 8 and 9, each channel estimate can be determined. The Least-Squares estimate, for example, is simply $$H_{mn}[k] = \frac{Y_m[k,b]}{LS_n[k,b]} \begin{cases} \text{for } k=4z & \text{and } \{n,b\} = \{1,4\}, \{2,9\}, \{3,8\}, \{4,7\} \\ \text{for } k=4z+2 & \text{and } \{n,b\} = \{1,7\}, \{2,4\}, \{3,9\}, \{4,8\} \\ \text{for } k=4z+1 & \text{and } \{n,b\} = \{1,8\}, \{2,7\}, \{3,4\}, \{4,9\} \\ \text{for } k=4z+3 & \text{and } \{n,b\} = \{1,9\}, \{2,8\}, \{3,7\}, \{4,4\} \end{cases}$$

Figure 3:
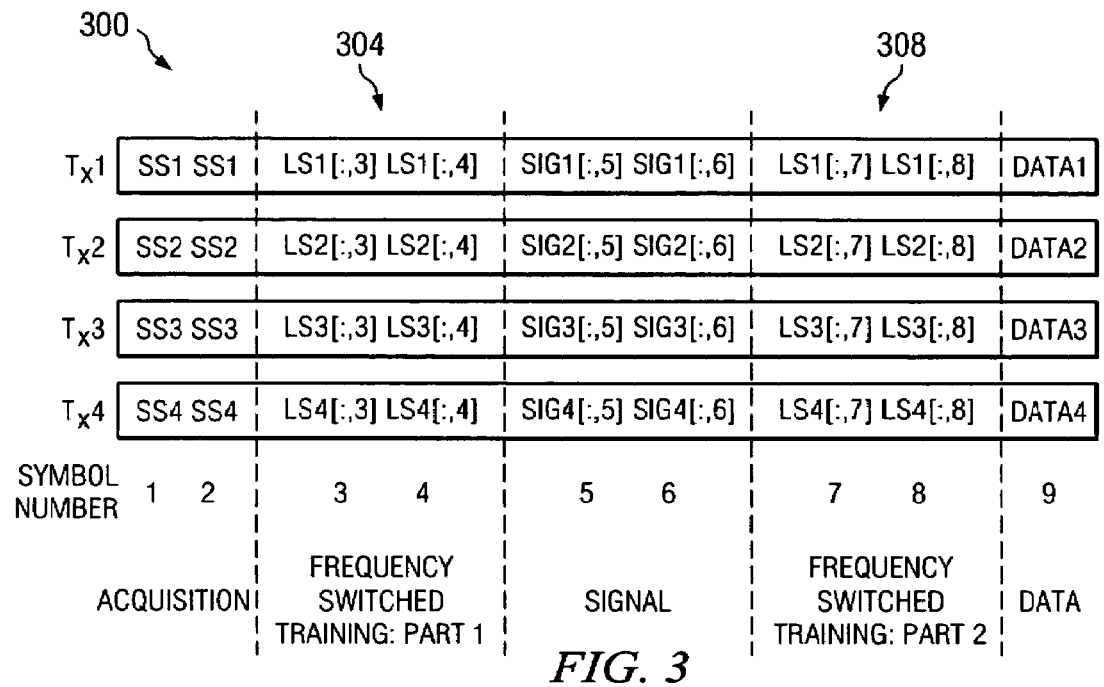
FIG. 3 illustrates a frequency switched preamble structure with an interleaving factor of 2.

Looking now at FIG. 3, the time optimal form of a frequency switched preamble structure 300 is depicted with interleaving that is backward compatible with 802.11a. Part 1 and part 2 of the frequency switched training 304, 308 can have interleaving so long as the backward compatibility constraints discussed herein before are able to be met. Frequency switched preamble structure 300 has an interleaving factor of 2. One possible set of training sequences is as follows $$LS_1[k,3] = LS_1[k,4]$$
$$= LS_2[k,7]$$
$$= LS_2[k,8]$$
$$= \begin{cases} TS[k] & \text{for } k=4z \\ 0 & \text{otherwise} \end{cases}$$

$$LS_2[k,3] = LS_2[k,4]$$
$$= LS_1[k,7]$$
$$= LS_4[k,8]$$
$$= \begin{cases} TS[k] & \text{for } k=4z+2 \\ 0 & \text{otherwise} \end{cases}$$

$$LS_3[k,3] = LS_3[k,4]$$
$$= LS_4[k,7]$$
$$= LS_1[k,8]$$
$$= \begin{cases} TS[k] & \text{for } k=4z+1 \\ 0 & \text{otherwise} \end{cases}$$

$$LS_4[k,3] = LS_4[k,4]$$
$$= LS_3[k,7]$$
$$= LS_2[k,8]$$
$$= \begin{cases} TS[k] & \text{for } k=4z+3 \\ 0 & \text{otherwise} \end{cases}$$

where $z \in \left\{0, 1, \ldots, \frac{Z}{4} - 1\right\}$.

The least squares channel estimates for this preamble are $$H_{mn}[k] = \frac{(Y_m[k,b] + Y_m[k,b-1])}{LS_n[k,b]} \begin{cases} \text{for } k=4z & \text{and } \{n,b\} = \{1,4\}, \{2,8\} \\ \text{for } k=4z+2 & \text{and } \{n,b\} = \{1,8\}, \{2,4\} \\ \text{for } k=4z+1 & \text{and } \{n,b\} = \{3,4\}, \{4,8\} \\ \text{for } k=4z+3 & \text{and } \{n,b\} = \{3,8\}, \{4,4\} \end{cases}$$

It should be noted that the averaging, (although not necessary), has been incorporated into the channel estimation process which nominally improves the estimate by 3 dB. Since not all of the subchannels, however, have been energized (each antenna only energizes ½ the tones), interpolation must be used. One method of interpolation is to perform IFFT (Inverse Fast Fourier Transform) using just the energized tones, zero pad the time domain data and perform an FFT (Fast Fourier Transform) back into the frequency domain.

Figure 4:
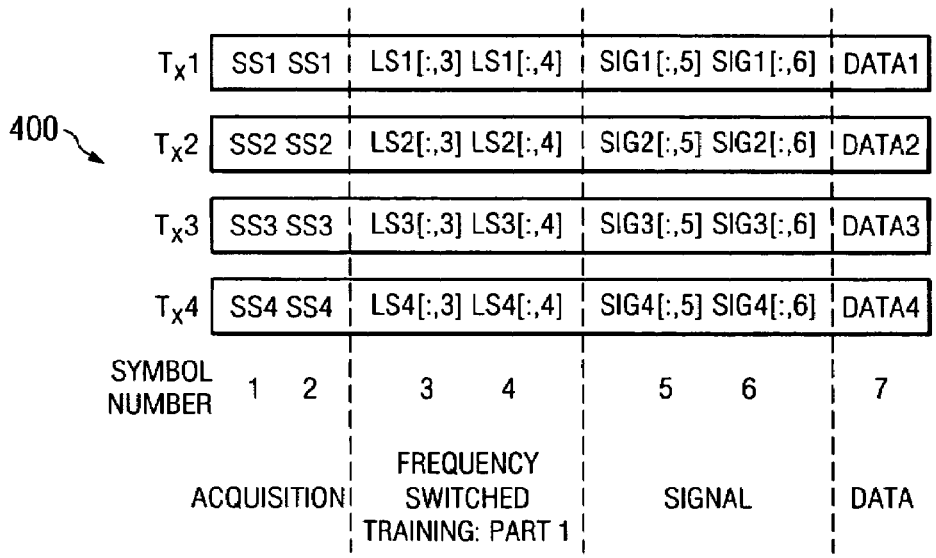
FIG. 4 illustrates a frequency switched preamble structure with an interleaving factor of 4.

FIG. 4 illustrates a Frequency switched preamble structure 400 that has an interleaving factor of 4. One possible set of training sequences is as follows $$LS_1[k,3] = LS_1[k,4]$$
$$= \begin{cases} TS[k] & \text{for } k=4z \\ 0 & \text{otherwise} \end{cases}$$

$$LS_2[k,3] = LS_2[k,4]$$
$$= \begin{cases} TS[k] & \text{for } k=4z+2 \\ 0 & \text{otherwise} \end{cases}$$

$$LS_3[k,3] = LS_3[k,4]$$
$$= \begin{cases} TS[k] & \text{for } k=4z+1 \\ 0 & \text{otherwise} \end{cases}$$

$$LS_4[k,3] = LS_4[k,4]$$
$$= \begin{cases} TS[k] & \text{for } k=4z+3 \\ 0 & \text{otherwise} \end{cases}$$

where $z \in \left\{0, 1, \ldots, \frac{Z}{4} - 1\right\}$.

The least squares channel estimates for this preamble are $$H_{mn}[k] = \frac{(Y_m[k,b] + Y_m[k,b-1])}{LS_n[k,b]} \begin{cases} \text{for } k=4z & \text{and } \{n,b\} = \{1,4\} \\ \text{for } k=4z+2 & \text{and } \{n,b\} = \{2,4\} \\ \text{for } k=4z+1 & \text{and } \{n,b\} = \{3,4\} \\ \text{for } k=4z+3 & \text{and } \{n,b\} = \{4,4\} \end{cases}$$

Again, it should be noted that the averaging, (although not necessary), has been incorporated into the channel estimation process which nominally improves the estimate by 3 dB. Since not all of the subchannels, however, have been energized (each antenna only energizes ¼ the tones), interpolation must be used. As stated herein before, one method of interpolation is to perform IFFT (Inverse Fast Fourier Transform) using just the energized tones, zero pad the time domain data and perform an FFT (Fast Fourier Transform) back into the frequency domain.

The frequency switch preamble structure becomes more time efficient than the time switched preamble structure, when interleaving is introduced into the training sequences. As the interleaving factor increases, the training symbols must of course be properly power adjusted to maintain the same power level as the acquisition portion of the preamble.

If 802.11a backward compatibility is not a design constraint, then the frequency switch preamble structure can potentially be shortened even further. The number of transmitters and the delay spread of the wireless channel factor will dictate the number of required symbols for channel estimation at the receiver.

In summary explanation, a frequency switched preamble structure suitable for use in a wireless MIMO communication system has been shown to be more time efficient than that achievable using a time switched preamble design, to optimize the MIMO channel estimation process with respect to time. The frequency switched preamble structure has also been shown to improve data throughput associated with the MIMO communication system by minimizing the number of symbols used for channel estimation, and to provide for backward compatibility with existing IEEE 802.11a compatible wireless communication systems.

In view of the above, it can be seen the present invention presents a significant advancement in the art of wireless communication systems. This invention has been described in considerable detail in order to provide those skilled in the wireless MIMO communication arts with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of minimizing communication channel estimation time, the method comprising the steps of:
    transmitting a first frequency switched training sequence portion of a preamble comprising tones associated solely with the first frequency switched training sequence; and
    transmitting a second frequency training sequence portion of the preamble subsequent to transmission of the first frequency switched training sequence portion of the preamble, wherein the second frequency training sequence comprises tones associated solely with the second frequency switched training sequence; and
    interpolating between the tones transmitted during the first and second frequency training sequences and generating communication channel estimates at missing tones there from.

2. The method according to claim 1, wherein the step of transmitting a first frequency switched training sequence comprising transmitting tones associated solely with the first frequency switched training sequence further comprises repeating transmission of at least one symbol to form a two symbol training sequence.

3. The method according to claim 2, further comprising the step of interpolating between the tones transmitted during the first and second frequency training sequences and generating communication channel estimates at missing tones there from.

4. The method according to claim 2, wherein the step of transmitting a second frequency switched training sequence comprising transmitting tones associated solely with the second frequency switched training sequence further comprises repeating transmission of at least one symbol to form a two symbol training sequence.

5. The method according to claim 1, further comprising the steps of:
    acquiring the preamble prior to transmitting the first frequency switched training sequence;
    transmitting a desired RF signal subsequent to transmitting the first frequency switched training sequence and prior to transmitting the second frequency training sequence; and
    transmitting desired data subsequent to transmitting the second frequency training sequence.

6. A method of minimizing communication channel estimation time, the method comprising:
    transmitting a first frequency switched training sequence portion of a preamble comprising tones associated solely with the first frequency switched training sequence;
    transmitting a second frequency training sequence portion of the preamble subsequent to transmission of the first frequency switched training sequence portion of the preamble, wherein the second frequency training sequence comprises tones associated solely with the second frequency switched training sequence; and
    interpolating between the tones transmitted during the first and second frequency training sequences and generating time averaged channel estimates at missing tones there from.

7. A method of minimizing communication channel estimation time, the method comprising the steps of:
    acquiring a preamble;
    transmitting a first frequency switched training sequence portion of the preamble;
    transmitting a second frequency training sequence portion of the preamble subsequent to transmission of the first frequency switched training sequence portion of the preamble, such that interleaved tones are generated there from; and
    interpolating between tones transmitted during the first and second frequency training sequences and generating communication channel estimates at missing tones there from.

8. The method according to claim 7, wherein the step of transmitting a first frequency switched training sequence comprises transmitting tones associated solely with the first frequency switched training.

9. The method according to claim 7, wherein the step of transmitting a first frequency switched training sequence comprises repeating transmission of at least one symbol to form a two symbol training sequence.

10. The method according to claim 7, wherein the step of transmitting a second frequency switched training sequence comprises transmitting tones associated solely with the second frequency switched training sequence.

11. The method according to claim 7, wherein the step of transmitting a second frequency switched training sequence comprises repeating transmission of at least one symbol to form a two symbol training sequence.

12. The method according to claim 7, further comprising the step of transmitting a desired RF signal subsequent to transmitting the first frequency switched training sequence and prior to transmitting the second frequency training sequence.

13. The method according to claim 7, further comprising the step of transmitting desired data subsequent to transmitting the second frequency training sequence.

14. A method of minimizing communication channel estimation time, the method comprising the steps of:
  acquiring a preamble;
  transmitting a first frequency switched training sequence portion of the preamble;
  transmitting a second frequency training sequence portion of the preamble subsequent to transmission of the first frequency switched training sequence portion of the preamble, such that interleaved tones are generated there from, wherein the communication channel estimates at missing tones comprise time averaged estimates.

15. A method of minimizing communication channel estimation time, the method comprising the steps of:
  acquiring a preamble;
  transmitting a first frequency switched training sequence portion of the preamble;
  transmitting a second frequency training sequence portion of the preamble subsequent to transmission of the first frequency switched training sequence portion of the preamble, such that interleaved tones are generated there from; and
  adjusting training symbol power levels in response to a changing interleaving factor such that the power level associated with the training sequences substantially matches the power level associated with the acquisition portion of the preamble.

16. A method of minimizing communication channel estimation time, the method comprising the steps of:
  partitioning a preamble into parts comprising a first frequency switched training sequence and a second frequency switched training sequence;
  transmitting interleaved symbols associated with the first and second frequency switched training sequences such that interleaved tones are generated there from; and
  interpolating between the interleaved tones transmitted during the first and second frequency training sequences and generating communication channel estimates at missing tones there from.

17. The method according to claim 16, wherein the communication channel estimates at missing tones comprise time averaged estimates.

18. The method according to claim 16, wherein the step of transmitting the first and second frequency switched training sequences comprises transmitting tones associated solely with the first frequency switched training sequence and transmitting tones associated solely with the second frequency switched training sequence.

19. The method according to claim 16, wherein the step of transmitting the first and second frequency switched training sequences comprises repeating transmission of at least one symbol during the first frequency switched training sequence to form a two symbol training sequence.

20. The method according to claim 16, wherein the step of transmitting the first and second frequency switched training sequences comprises repeating transmission of at least one symbol during the second frequency switched training sequence to form a two symbol training sequence.

21. The method according to claim 16, further comprising the step of transmitting a desired RF signal subsequent to transmitting the first frequency switched training sequence and prior to transmitting the second frequency training sequence.

22. The method according to claim 16, further comprising the step of transmitting desired data subsequent to transmitting the second frequency training sequence.

23. The method according to claim 16, further comprising the step of adjusting training symbol power levels in response to a changing interleaving factor such that the power level associated with the training sequences substantially matches the power level associated with the acquisition portion of the preamble.

* * * * *